Dec. 7, 1948.　　　　T. C. DODGE　　　　2,455,741
AUTOMATIC CAN DISTRIBUTOR
Filed April 23, 1946　　　　　　　　　　　　　6 Sheets-Sheet 1
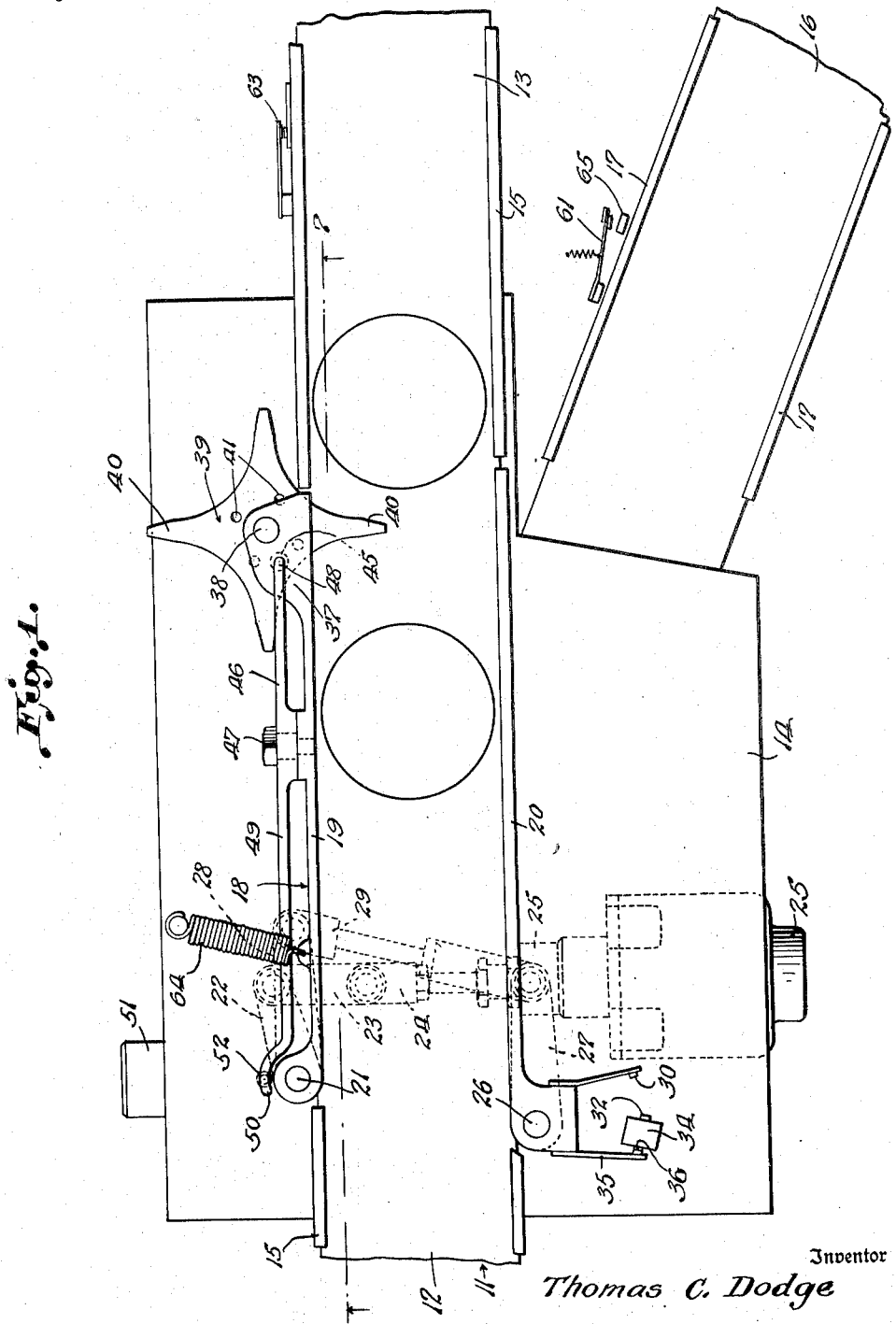
Inventor
Thomas C. Dodge
By Mason, Porter, Diller & Stewart
Attorneys Dec. 7, 1948.                    T. C. DODGE                    2,455,741
                          AUTOMATIC CAN DISTRIBUTOR
Filed April 23, 1946                                         6 Sheets-Sheet 2
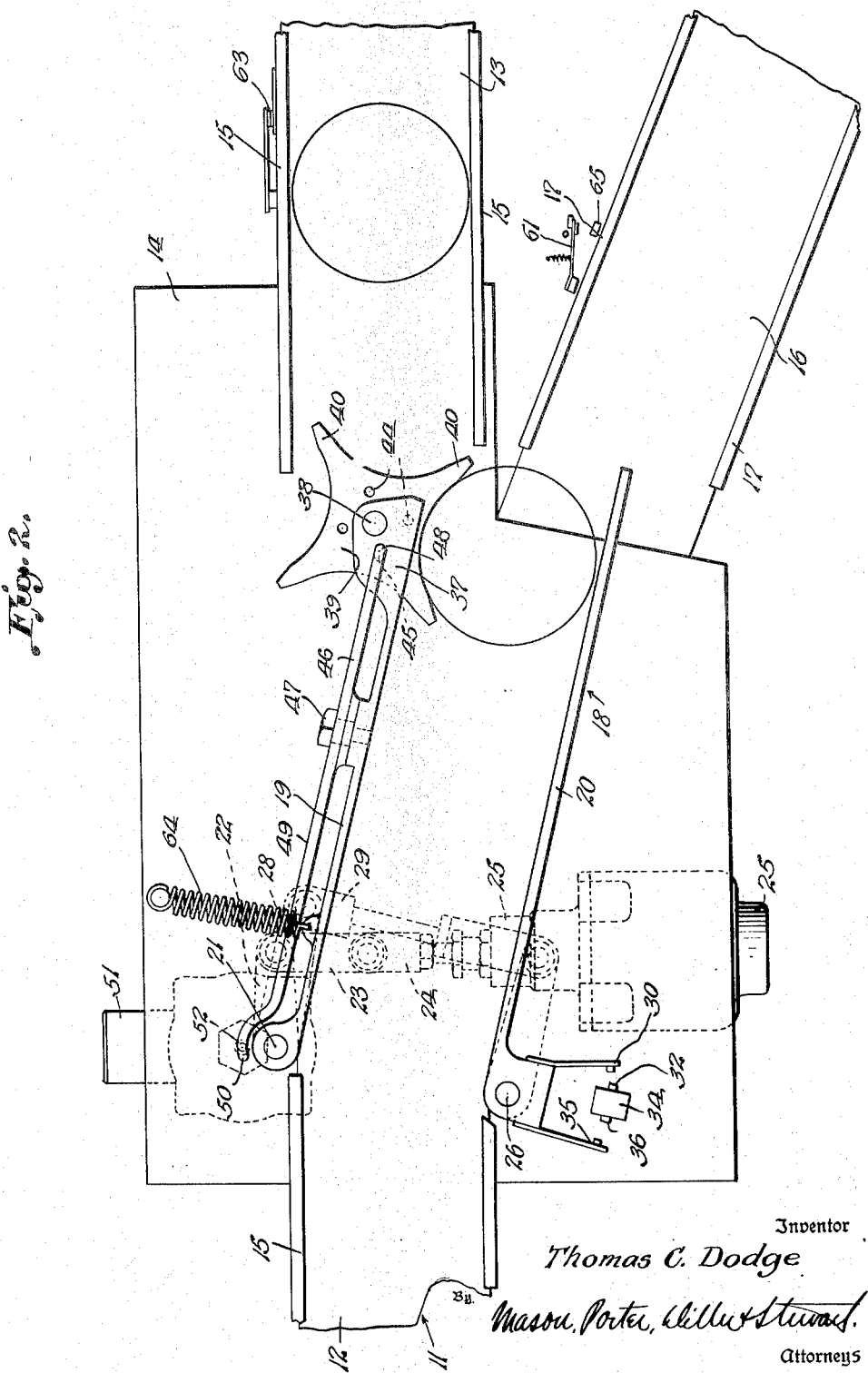
Inventor
Thomas C. Dodge
By Mason, Porter, Miller & Stewart
Attorneys

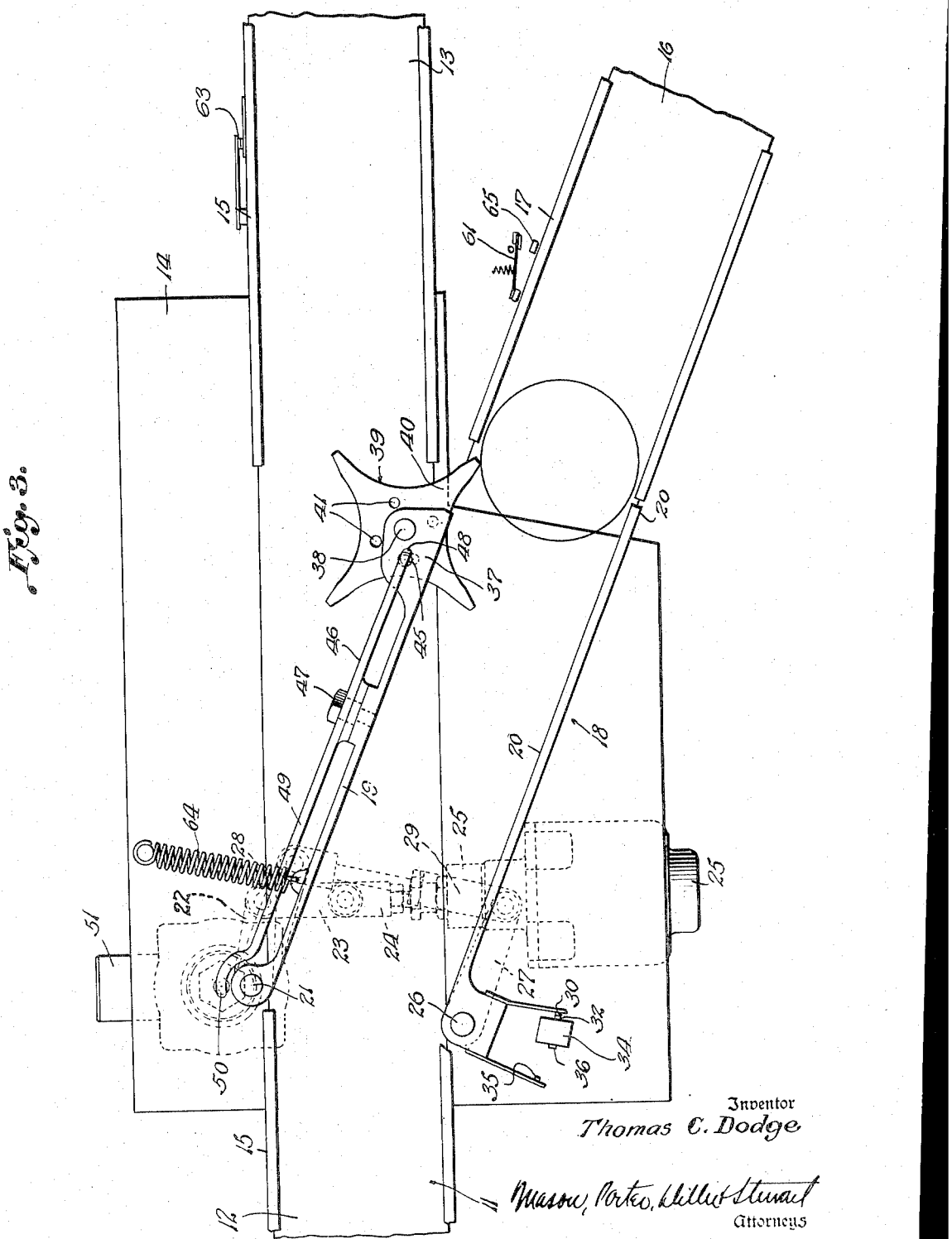

Dec. 7, 1948.  T. C. DODGE  2,455,741
AUTOMATIC CAN DISTRIBUTOR
Filed April 23, 1946  6 Sheets-Sheet 4
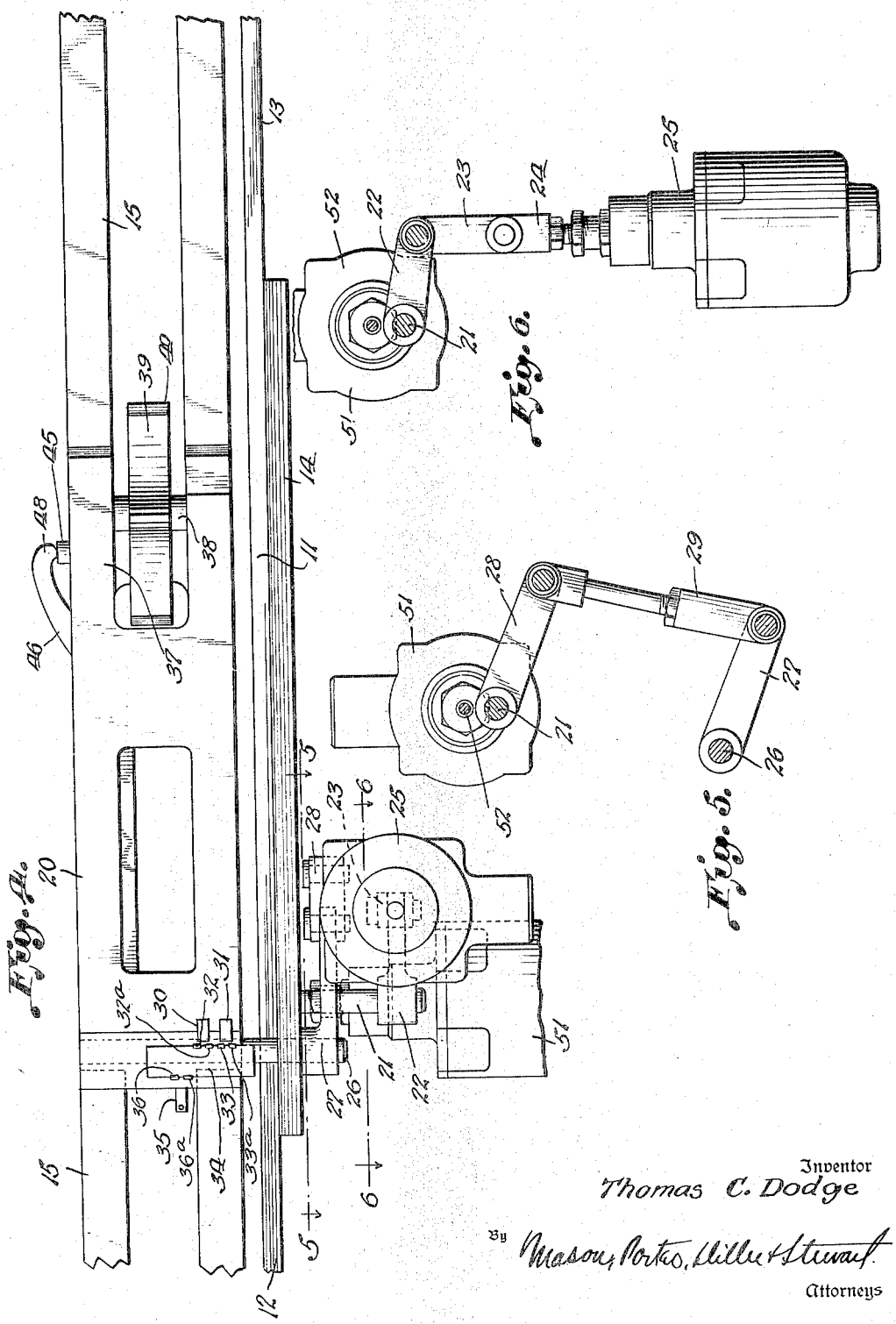
Inventor
Thomas C. Dodge
By Mason, Porter, Miller & Stewart
Attorneys Dec. 7, 1948. T. C. DODGE 2,455,741
AUTOMATIC CAN DISTRIBUTOR
Filed April 23, 1946 6 Sheets-Sheet 5
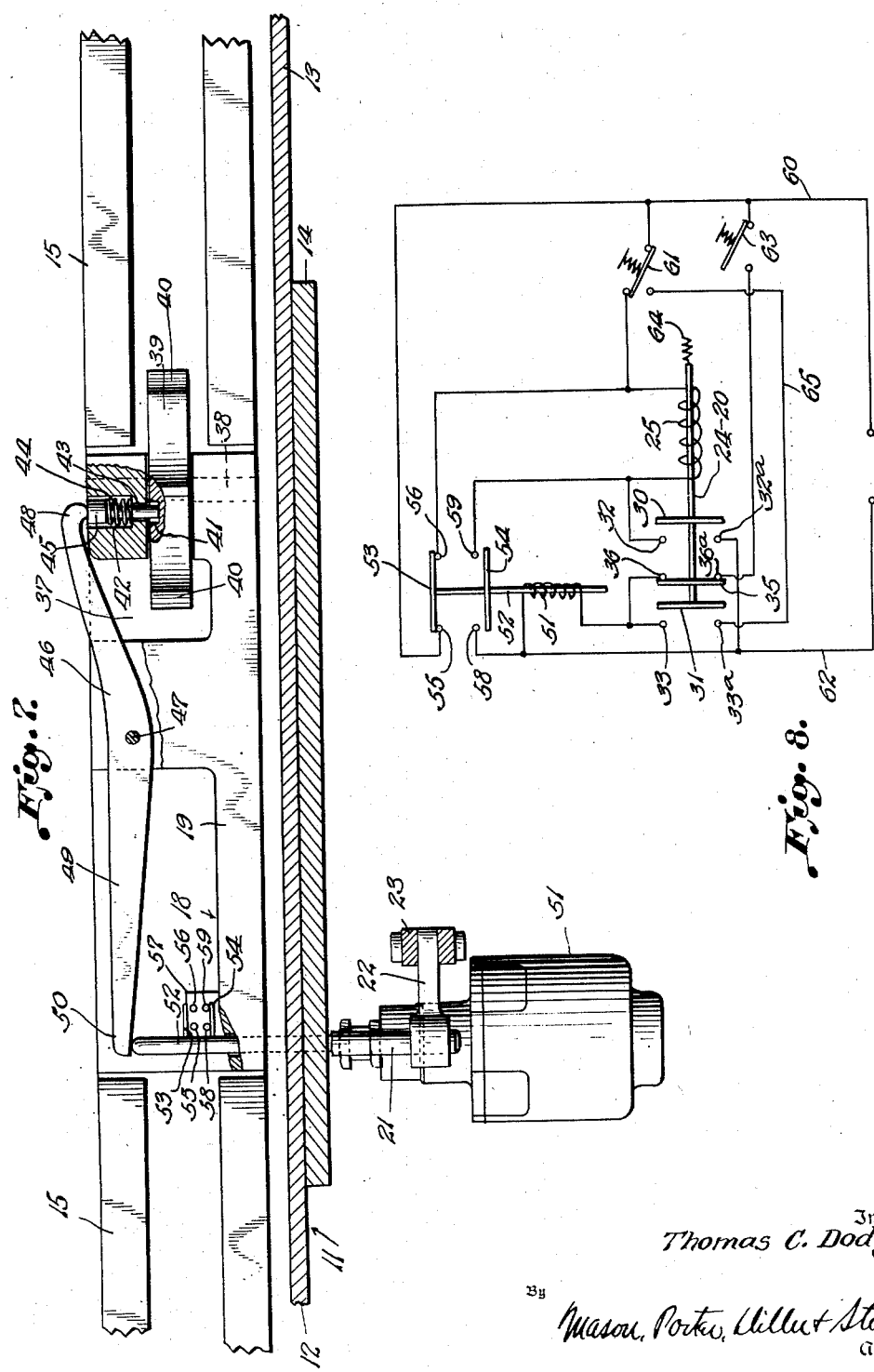
Inventor
Thomas C. Dodge
By
Mason, Porter, Miller & Stewart
Attorneys.

Dec. 7, 1948.  T. C. DODGE  2,455,741
AUTOMATIC CAN DISTRIBUTOR
Filed April 23, 1946  6 Sheets-Sheet 6

Inventor
Thomas C. Dodge
By Mason, Porter, Diller & Stewart
Attorneys

Patented Dec. 7, 1948

2,455,741

UNITED STATES PATENT OFFICE 2,455,741

AUTOMATIC CAN DISTRIBUTOR

Thomas C. Dodge, Seattle, Wash., assignor to Continental Can Company, Inc., New York, N. Y., a corporation of New York Application April 23, 1946, Serial No. 664,389

8 Claims. (Cl. 198—31)

This invention, of which the following is a specification, is a system for distributing cans or like articles fed one at a time from a single conveying source to a plurality of discharge devices, as well as the novel mechanism by which the system is carried out.

In can-feeding operations to which the description will be primarily directed, it frequently happens that cans from a single line of travel must be delivered rapidly into a number of discharge lines of less capacity. To divide the oncoming stream of cans into the requisite proportions needed to keep all of the discharge lines filled to capacity is an important problem. Whenever any single discharge line is filled to capacity the cans must be diverted immediately to another discharge line without permitting the cans to congest the incoming feed line.

As soon as the second discharge line has been filled, the stream of cans must then be diverted either to a third discharge line or back to the first one.

Since the main feed line is generally proportioned with a capacity equal to the sum of the capacities of all of the discharge lines, no delay can take place without a congestion occurring in the main feed line.

In particular it is necessary to prevent loose cans from clogging or obstructing the machine while a switch movement is taking place.

A prime object of my invention is to provide a system whereby the full capacity of the feed line may be delivered to two or more discharge lines automatically and without attention from the operator.

Another object of my invention is to provide means for automatically shifting the delivery as soon as the main discharge line has become filled to its capacity.

A further object is to provide means for holding the foremost can in advance of its delivery to the discharge line when the capacity of the latter has been reached and further to time the shift in the delivery of cans to another discharge line to follow this filling of the first line.

Among the objects of my invention is also the release of the arrested can at the end of the shift and when it is in proper position for delivery to a second discharge line.

Furthermore, an object of my invention is to stop the feed of cans as soon as the second discharge line has been filled to capacity and to divert the feed to another discharge line or return it to the original discharge line.

There is a still further object of my invention to arrest the feed of cans at the outlet end of the shifting means whenever all discharge lines are full, but to resume delivery automatically to whichever discharge line first becomes empty enough to receive more cans.

This system and the corresponding apparatus are applicable to the automatic discharge of any articles or loose material which may be fed in a conveying system of general description. This will include systems of cables, belts, chains, or gravity runways. For purposes of example, however, I have applied the invention in the following description of the automatic distribution of metal cans which may either be empty or filled. The invention is also shown in the accompanying drawings in which Fig. 1 is a plan view of my improved system operating to deliver cans in the normal direction;

Fig. 2 is a similar view showing the apparatus at the moment of shifting for delivery in the alternate direction;

Fig. 3 is a similar view showing the distribution in the alternate direction;

Fig. 4 is a side elevation of the apparatus in the position shown in Fig. 1;

Fig. 5 is a horizontal section on the line 5—5 in Fig. 4, showing the linkage between the sides of the gate;

Fig. 6 is a horizontal section on the line 6—6 in Fig. 4, showing the gate operating means;

Fig. 7 is a vertical longitudinal section partly broken away on the line 7—7 in Fig. 1, showing the star wheel locked;

Fig. 8 is a wiring diagram for the system, and

Figure 9:
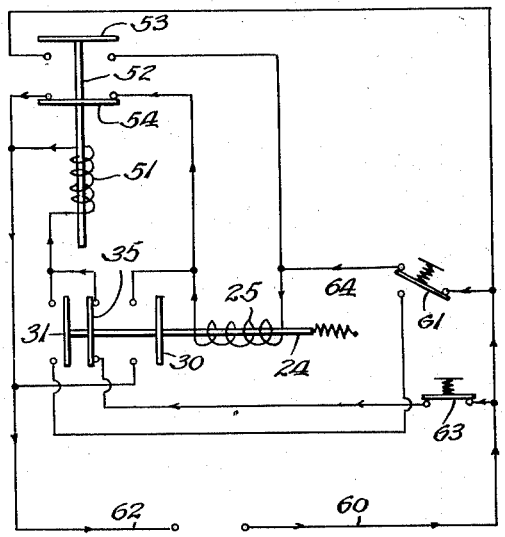
Figs. 9, 10, 11 and 12 are similar wiring diagrams showing the circuits operating under different conditions of load.

The system is carried out by apparatus which consists broadly of a single feed line from which successive cans or like articles are delivered into two or more discharge lines also in the form of conveyors, runways or the like. Assuming that the incoming stream of cans is proportioned to equal the sum of the capacities of the discharge lines, facilities must be provided for distributing the cans between the discharge lines in proportion to or as their capacities are reached.

I have provided such a distributing means in the form of a gate which is shifted or traversed from the position of feeding one discharge line to a second or subsequent discharge line. At the same time an important feature of the invention is arresting the movement of the foremost can being fed and holding it during the shifting movement so that it will not be discharged prior to the moment when its movement will take it into the desired discharge path. Suitable means are provided to delay the shifting movement until after the foremost can has been held, timing the sequence of operations and shifting the gate as conditions may require.

The incoming feed line is shown as a conveyor 11. This is preferably a belt conveyor although it may be a chain, cable or other conveyor or a gravity runway.

In the simplest form the conveyor 11 may consist of a main feeding section 12 and a subsequent delivery section 13. This is arranged by passing the conveyor belt over the platform 14 on which the can distributing operations take place.

Suitable side rails 15 overlie the edges of the conveyor in the usual manner.

A second delivery section which may also be considered a side or alternative conveyor is formed by means of a belt conveyor 16. This conveyor is arranged at an angle to the main delivery section 13 as indicated in Fig. 1. Side rails 17 are also provided over the edges of the belt conveyor 16 and constrain the cans to move longitudinally thereof.

The distributing means which is in the form of a gate 18 has two side bars 19 and 20. Side bar 19 is carried by a vertical shaft 21 which in turn is loosely journaled in the platform 14. Beneath the platform 14 and as shown more clearly in Fig. 4 the lower end of the vertical shaft 21 has a fixed rock arm 22 by which it may be oscillated.

The outer end of the rock arm 22 is connected by means of a link 23 to the plunger 24 of a horizontal solenoid 25. This solenoid is called the shifting solenoid as its purpose is to shift the gate between the two operating positions.

The second gate bar 20 is mounted on a second vertical shaft 26 also journaled in the platform 14 and on the opposite side of the conveyor belt 11. The gate bar 20 is caused to swing in parallelism with the gate bar 19. This is accomplished by providing a rock arm 27 on the lower end of shaft 26 and below the platform 14 and a similar rock arm 28 on the lower end of shaft 21. The rock arm 28 is of the same length as the rock arm 27 and extends in the same direction. The rock arms 27 and 28 are connected by means of an adjustable link 29 (see Fig. 5). The motion of the solenoid plunger 24 is thus transmitted first to the rock shaft 21 and then by means of the link 29 to the opposite rock shaft 21.

Gate bar 20 at the point of attachment to the rock shaft 26 carries two spring contacts 30 and 31. These may be brought into contact with similar switch points 32, 32a and 33, 33a respectively on a pillar 34 mounted on the platform 14. A spring finger 35 also mounted upon the gate bar 20 can be brought into contact with contacts 36, 36a on the pillar 34 opposite the contacts 32 and 33. In this way the circuit through 36 and 36a will be closed while the gate is in the position shown in Fig. 1 but when the gate is shifted to the alternate position, this contact is broken and the circuits are closed through 32, 32a and 33, 33a respectively.

The opposite gate bar 19 has a forked end 37 as shown in Fig. 4. This forms a bearing for a vertical shaft 38 (see Fig. 1). A star wheel 39 is carried loosely on the shaft 38 and has four vanes 40 equidistantly spaced.

The upper surface of the star wheel has a series of four equally spaced holes 41.

In the upper portion of the forked end 37 opposite the star wheel there is a vertical hole having a bore 42 and a small bore 43 in alignment with the holes 41 of the star wheel. Within the large bore 42 there is a helical spring 44 surrounding the stem of a locking pin 45, the large head of which rests upon the helical spring 44 and projects normally above the top of the gate bar 19.

A tappet bar 46 is loosely pivoted by means of pin 47 to the outer surface of the gate bar 19. Finger 48 of the tappet rests upon the enlarged head of locking pin 45. The opposite lever arm 49 of the tappet 46 has a semi-circular extension 50 which is concentric with the shaft 26.

Beneath the platform 14 and in alignment with the circular portion 50 there is a vertical solenoid 51. This solenoid has an upstanding pressure rod 52. When the solenoid is de-energized, the pressure rod 52 rests in its lower position as shown in dotted lines in Figure 4 and the tappet bar 46 is held up by the helical spring 44. However when the solenoid is energized the pressure rod and the tappet 46 press down upon the locking pin 45. The pin drops into the appropriate hole 41 of the star wheel as the latter rotates following the motion of the can being fed over the conveyor belt 11.

The position of the holes 41 is such that the star wheel is locked by the tappet 46 and pin 45 when the can has moved the star wheel to the obstructing or locking position shown in Fig. 2. Thereupon the can is arrested and held against delivery into the delivery section 13.

The can is retained in place between the gate bars 19 and 20 during the shift from the main delivery 13 to the side delivery 16 and vice versa. At the conclusion of the movement the can is released and delivered with the succeeding cans into the appropriate runway.

The shifting solenoid 25 operates to move the gate from the main delivery runway 13 to the side or alternative delivery 16 and holds the gate in that position as long as the solenoid circuit is energized. To restore the gate to its original position in line with the main delivery, I provide a coil spring 64 extending from an ear on side bar 19 to a post on platform 14.

The rise and fall of the rod 52 is made use of to control the circuits energizing the solenoids 25 and 51. For this purpose the rod 52 has a pair of vertically disposed insulated contact blades 53 and 54. The upper blade 53 in its lower position connects switch points 55 and 56 mounted on a permanent bracket 57 rising from the platform 14. The lower blade 54 in its uppermost position contacts switch points 58 and 59 on bracket 57 and below the points 55 and 56.

A source of electric current is indicated by the leads 60 and 62. Lead 60 is connected to switch point 55 while lead 62 is connected to the lower contact point 58.

The contact point 56 is connected to one end of the solenoid 25. The opposite end of the solenoid winding 25 is connected to terminal 59 of the lower pair.

A spring held switch 61 is permanently in circuit with the lead 60 and connected by a shunt to the same end of the solenoid winding 25 as the switch point 56. The action of the spring in switch 61 is to bias it to closed position with this shunt.

The switch 61 is mounted on the side delivery runway 16 in such manner that the switch will remain in the spring-held closed position as long as cans are traveling at the normal rate over the conveyor 16. However, when cans accumulate or fill the conveyor 16, the weight is sufficient to overcome the spring and throw the switch into contact with a second lead 65.

The second lead 65 is connected to a contact 33a opposite contact 33.

Contact 32 is connected to the same end of the winding of solenoid 25 as contact 59. Contact 32a is connected to lead 62 and bridge 30 forms a connection between contacts 32 and 32a.

The above circuit arrangements will energize solenoid 25 conditioned on current passing through switch 61 or 53 on the one side and 30 or 54 on the opposite side.

A switch 63 associated with the main delivery conveyor 13 is spring held in a normally opened position. It connects lead 60 with the contact point 36a opposite the contact point 36. During the normal passage of cans over conveyor 13, switch 63 remains open. However, when discharge cans accumulate to an undesired degree on the conveyor 13, the weight of the cans overcomes the spring and closes switch 63. Current is then delivered through the bridge 35 and solenoid 51 to the opposite lead 62 and the plunger 52 raised until contacts 58 and 59 are bridged by 54. The plunger 52 thus effects the locking of the star wheel 39 and stops further delivery of the cans to the main delivery runway.

At the same time bridge 54 energizes solenoid 25 and shifts the gate to the side delivery.

This operation breaks the circuit at 35 and allows solenoid 51 to become deenergized and the circuit 25 to be broken at 54. However, the movement of the member 24 has closed the circuit through 30 and continues to hold the member 24 in position to deliver cans to the side delivery.

The movement of the member 24 has also bridged the contacts 33 and 33a by means of contact 31 and thus prepared a holding circuit through solenoids 51 and 65 in anticipation of a shift of switch 61 when the side delivery is filled.

The wiring diagram in Fig. 8 shows the condition of the circuits during the normal delivery of cans over the main delivery 13. Briefly, as long as switches 61 and 63 are up, cans are fed over the main delivery. Neither windings 25 or 51 are energized, but bridge 35 is closed in anticipation of the closing of switch 63.

As soon as the main delivery is loaded, switch 63 closes. Current through 35, 51 and 62 raises the solenoid plunger 52 to lock the star wheel in its next forward movement. Bridge 54 closes and energizes the shifting solenoid 25 through closed switch 61 and leads 60 and 62. The gate then moves to the side delivery. Fig. 9 illustrates the circuits effective when the solenoid 52 rises and before member 24 and the gate are shifted.

At the conclusion of the shift of member 24 and the gate, circuit 35 is broken; consequently the rod 52 drops and the bridge 54 no longer functions. Accordingly the star wheel is released and cans are fed over the side delivery 16. The circuit through 30 and the winding of solenoid 25 is closed by reason of the closed switch 61 and this circuit is also closed by switch 53 in advance of the opening of switch 61 and before the cans are stopped by the star wheel. Therefore, the gate is held in line with the side delivery 16 during normal delivery of the cans.

Figure 10:
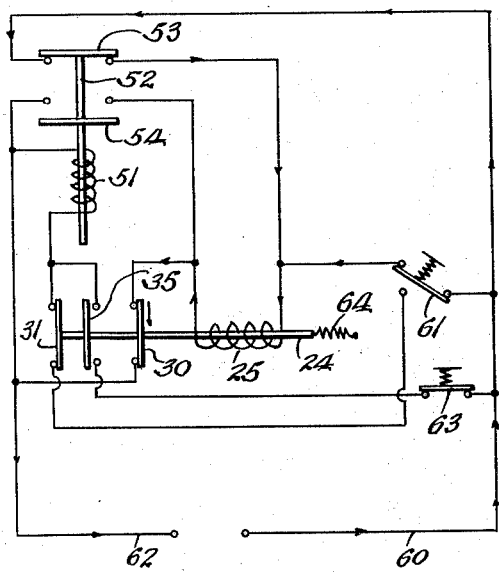

It will be noted that the member 24 brings the bridge 31 over contacts 33 and 33a but that this circuit of solenoid winding 51 is open at switch 61. Fig. 10 illustrates this condition. Cans are thus fed over the side delivery.

Figure 11:
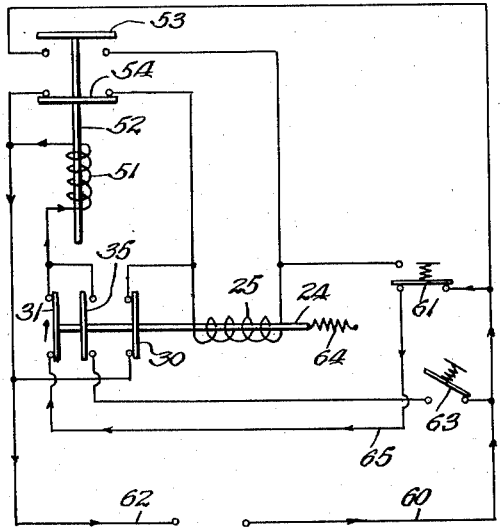

In Fig. 11 I have shown switch 61 as being brought into contact with lead 65 by reason of a congestion of cans on the side delivery. When this happens current flowing through line 65 and switch 61 energizes the winding of solenoid 51 and raises the rod 52. The star wheel is, therefore, locked in obstructing position. At the same time the circuit of solenoid 25 is opened. The immediate result is the retraction of member 24 by spring 64. This causes the gate to swing back into position for the main delivery. It will be apparent that in the meantime the main delivery has been prepared to receive additional cans and that as a consequence the switch 63 is opened by its spring.

As the member 24 is retracted, bridge 31 is opened and the winding 51 deenergizes thus releasing the latch of the star wheel. Bridge 35 is restored to closed circuit with contacts 36 and 36a in anticipation of fully loading the main delivery.

As shown in Fig. 11 the arrangement is in condition for a second diversion to the side delivery as indicated by Fig. 8.

Figure 12:
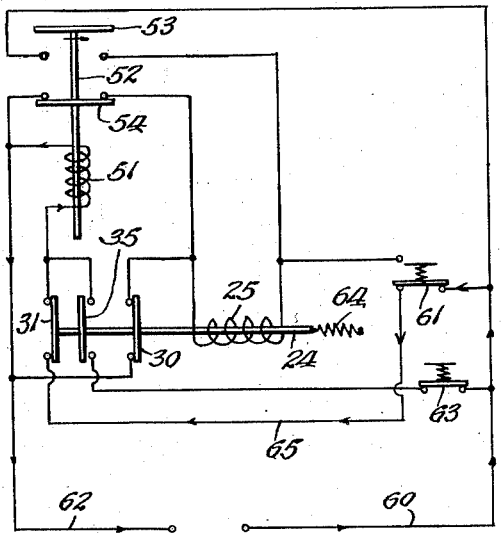

In Fig. 12 it is assumed that the side delivery has filled up and its switch 61 closed before the congestion on the main delivery has been disposed of. As a consequence switch 63 is still closed. It is, therefore, desired to restore the gate to the main delivery, but to maintain the star wheel locked against further feeding of the main delivery. Continued closing of the switch 63 maintains the circuit in the winding of solenoid 51 through the bridge 35. The rod 52 is then held up and the locking pin remains in one of the holes in the star wheel.

Momentarily, after the breaking of the circuit at 61, the holding circuit of the shifting solenoid 25 is maintained through bridge 53 until the cans are stopped by the locking solenoid 51 and the star wheel.

The arrangement outlined above is effective to distribute a supply of articles such as cans between two or more discharge paths. The distribution is controlled by completing the supply to one path until its capacity is reached, whereupon the movement of the next successive unit or can is arrested and the stream of articles shifted to a second path. The articles are then released for further delivery.

When the second discharge path is filled, the articles are again arrested while the stream is diverted back to the first discharge path. If the latter can receive the stream, it is then released for delivery; otherwise, the assembly is held inoperative until one or the other of the discharge paths is clear. The device then shifts the stream to the path which can receive the articles, preference being given to the first or main delivery path.

The preferred form of the invention has been illustrated by way of example. However, wide variation in structural details can be exercised without departing from the scope of the invention as defined in the following claims.

I claim:

1. Means for automatically distributing a succession of cans or the like into a plurality of runways in accordance with their several capacities, comprising a conveyor for feeding the cans, a main discharge conveyor and a secondary discharge conveyor, a shiftable gate from the feed conveyor, a detent on the gate operable by the filling of either discharge conveyor to its capacity to arrest and hold the next succeeding can on the gate and means for shifting said gate to discharge said can and the succeeding cans into the other discharge conveyor.

2. Means for automatically distributing a succession of cans or the like into a plurality of runways in accordance with their several capacities, comprising a conveyor for feeding the cans, a main discharge conveyor and a secondary discharge conveyor, a shiftable gate from the feed conveyor, a detent on the gate operable by the filling of either discharge conveyor to its capacity to arrest and hold the next succeeding can on the gate, means for shifting said gate to discharge said can and the succeeding cans into the other discharge conveyor and means to release the cans to the said other discharge conveyor.

3. Means for automatically distributing a succession of cans or the like into a plurality of runways in accordance with their several capacities, comprising a conveyor for feeding the cans, a main discharge conveyor and a secondary discharge conveyor, a shiftable gate from the feed conveyor, a detent on the gate operable by the filling of either discharge conveyor to its capacity to arrest and hold the next succeeding can on the gate, means for shifting said gate to discharge said can and the succeeding cans into the other discharge conveyor, means to release the cans to the said other discharge conveyor, means operable by the filling of said other discharge conveyor to its capacity to arrest and hold the next succeeding can on the gate and means to restore the gate to its original position and means to release the arrested cans for delivery to the original discharge conveyor.

4. Means for automatically distributing a succession of cans or the like into a plurality of runways in accordance with their several capacities, comprising a conveyor for feeding the cans, a main discharge conveyor and a secondary discharge conveyor, a shiftable gate from the feed conveyor, detent on the gate operable by the filling of the main discharge conveyor to its capacity to arrest and hold the next succeeding can on the gate, a solenoid for shifting said gate to discharge cans into the secondary conveyor, and means operable by said shifting movement to release the cans to said secondary conveyor.

5. Means for automatically distributing a succession of cans or the like into a plurality of runways in accordance with their several capacities, comprising a conveyor for feeding the cans, a main discharge conveyor and a secondary discharge conveyor, a shiftable gate from the feed conveyor, a detent on the gate operable by the filling of the main discharge conveyor to its capacity to arrest and hold the next succeeding can on the gate, a solenoid for shifting said gate to discharge cans into the secondary conveyor, means operable by said shifting movement to release the cans to said secondary conveyor and means for returning said gate to the main discharge conveyor when the solenoid is de-energized.

6. Means for automatically distributing a succession of cans or the like into a plurality of runways in accordance with their several capacities, comprising a conveyor for feeding the cans, a main discharge conveyor and a secondary discharge conveyor, a shiftable gate from the feed conveyor, a detent on the gate operable by the filling of either discharge conveyor to its capacity to arrest and hold the next succeeding can on the gate, a solenoid for shifting said gate to discharge cans into the secondary conveyor, means for shifting said gate back to the main discharge conveyor when the solenoid is de-energized and means operable by said completion of the shifting of the gate to release the cans for delivery to the selected discharge conveyor.

7. Means for automatically distributing a succession of cans or the like into a plurality of runways in accordance with their several capacities, comprising a conveyor for feeding the cans, a main discharge conveyor and a secondary discharge conveyor, a pivoted gate from the feed conveyor, a star-wheel mounted to rotate across the gate, means operable by the filling of either discharge conveyor to its capacity to lock the star-wheel against rotation, means for shifting said gate to discharge cans into the secondary conveyor, means for shifting said gate back to the main discharge conveyor, and means operable by the completion of the shifting of the gate to release the star-wheel for free rotation.

8. Means for automatically distributing a succession of cans or the like into a plurality of runways in accordance with their several capacities, comprising a conveyor for feeding the cans, a main discharge conveyor and a secondary discharge conveyor, a pivoted gate from the feed conveyor, a star-wheel mounted to rotate across the gate, locking means for said star wheel, a solenoid operable by the filling of either discharge conveyor to its capacity to actuate said locking means, means for shifting said gate to discharge cans into the secondary conveyor, means for shifting said gate back to the main discharge conveyor, and means operable by the completion of the shifting of the gate to de-energize said solenoid.

THOMAS C. DODGE.

REFERENCES CITED

The following references are of record in the file of this patent:

UNITED STATES PATENTS

| Number | Name | Date |
|---|---|---|
| 1,236,391 | Augensen | Aug. 14, 1917 |
| 1,806,879 | Lindgren | May 26, 1931 |
| 2,066,869 | Wild | Jan. 5, 1937 |
| 2,312,060 | Kimball | Feb. 23, 1943 |